United States Patent [19]

Leibowitz

[11] 4,012,831
[45] Mar. 22, 1977

[54] ELECTROCHROMIC DISPLAY ELEMENT AND PROCESS

[75] Inventor: Marshall Leibowitz, Englewood, N.J.
[73] Assignee: Timex Corporation, Waterbury, Conn.
[22] Filed: Apr. 23, 1976
[21] Appl. No.: 679,618

Related U.S. Application Data

[62] Division of Ser. No. 615,013, Sept. 19, 1975, Pat. No. 3,975,086.
[52] U.S. Cl. .............................. 29/570; 29/576 R; 29/592
[51] Int. Cl.² ......................................... B01J 17/00
[58] Field of Search ................... 29/570, 576, 592; 350/160

[56] References Cited
UNITED STATES PATENTS

| | | | |
|---|---|---|---|
| 3,840,286 | 10/1974 | Kiss | 350/160 |
| 3,840,287 | 10/1974 | Witzke | 350/160 |
| 3,840,288 | 10/1974 | Schnatterly | 350/160 |
| 3,844,636 | 10/1974 | Maricle | 350/160 |

Primary Examiner—W. Tupman

[57] ABSTRACT

An electrochromic display for selectively displaying optical patterns comprising a sandwich type structure which includes transparent front electrodes, electrochromic layers on the front electrodes, an electrolyte and a special electroreactive layer on a rear electrode. The electroreactive layer, which serves as hydrogen source, is composed of electrochromic material which is first oxidized and subsequently heat treated in a hydrogen or forming gas atmosphere to improve the operating and life characteristics of the display. The electrodes are mounted or deposited respectively on parallel substrates which form the outer structures of a hermetically sealed display arrangement. The electroreactive layer can be a single layer structure serving the functions of both the rear electrode and hydrogen source material.

2 Claims, 2 Drawing Figures

ELECTROCHROMIC DISPLAY ELEMENT AND PROCESS

This is a division of application Ser. No. 615,013 filed Sept. 19, 1975, now U.S. Pat. No. 3,975,086.

BACKGROUND OF THE INVENTION

This invention relates generally to electrooptical displays of the electrochromic type wherein the electrochromic material undergoes reversible color changes upon the application of an electric field. More particularly, the invention discloses an electrochromic display which includes an improved rear electrode with special electroreactive layer. The invention further relates to a process for making the improved electrochromic display of the present invention.

U.S. Pat. No. 3,840,287 to H. Witzke et al. which issued Oct. 8, 1974 describes a typical electrochromic cell having a symmetrical type structure. The patent discloses a color promoting agent such as a palladium layer having hydrogen associated therewith located between a first and second layer of electrochromic material and respective electrode layers which are on the outside of said electrochromic layers. The Witzke patent, in effect, discloses a cell arrangement represented as follows: $SnO_2/WO_3$/Color Assisting Agent-/$WO_3/SnO_2$; wherein $SnO_2$ represents a conductive tin oxide layer and $WO_3$ represents an electrochromic tungsten oxide layer. The feature of the Witzke cell is the unbalanced arrangement wherein one of the electrochromic layers is initially in its colored state so that current can readily flow through this layer. Thus, one of the electrochromic layers is colored after the cell is completed by exposure to ultraviolet radiation or another suitable process.

U.S. Pat. No. 3,827,784 to R. D. Giglia et al. which issued Aug. 6, 1974 is also of interest in this area and discloses an electrooptical data display formed by a sandwich arrangement of the imaging area and the counter electrode area with a suitable ion conducting layer therebetween. The counter electrode comprises a bonded graphite tungsten oxide mixture which improves the electrochromic reversibility, speed, and cell life over prolonged coloration and erase cycles.

Other background art of general interest in the area of electrochromic displays include U.S. Pat. No. 3,521,941 to Deb et al., issued July 28, 1970 which discloses various electrochromic materials and U.S. Pat. Nos 3,283,656 to Jones, issued Nov. 8, 1966, and 3,704,057 to Beagle which disclose various displays using electrochromic materials. Also of interest is the pending application of M. Leibowitz, Ser. No. 540,481 filed Jan. 13, 1975 which is assigned to the assignee of record of this application.

A serious problem in existing electrochromic displays is the difficulty in achieving a hermetic seal to prevent air from leaking into the display. On the prior art one of the electrochromic layers serves as a source of hydrogen ions which travel from rear to front electrode by ionic conduction through the electrolyte to provide color in the front layers of electrochromic material. If the seal leaks air into the cell, the hydrogen will combine with oxygen in the air and become depleted. It is necessary to provide sufficient hydrogen to provide the color changes for display purposes and to respond to an applied voltage. Attempts have been made to solve this problem by generating hydrogen during cell usage but such an arrangement requires a rather high voltage. Another solution has been to impart molybdenum into the tungsten oxide to make it photosensitive and then expose the material to light to produce a blue hydrogen layer. This arrangement, however, generally requires three separate voltages, one to turn on the display, a second to turn off the display and a third to maintain it off.

A further important advantage of this invention is that the display operates at a lower voltage than prior art displays since it is not necessary to generate hydrogen from the electrolyte. Having a lower operating voltage also prolongs cell life since operating at higher voltages over a prolonged period tends to destroy the display.

Accordingly, an object of this invention is to provide a new and improved electrochromic display having a treated electroreactive layer which improves the operating and life characteristics of the display.

Another object of this invention is to provide a new and improved electroreactive layer for an electrochromic display which can also serve as rear electrode.

Another object of this invention is to provide a process for producing a new and improved electroreactive electrode for an electrochromic display.

A more specific object of this invention is to provide a new and improved electrochromic display of a sandwich type construction and a method for making said display wherein a rear electroreactive layer is oxidized and heat treated in situ to provide a display having a lower operating voltage and increased display life.

Another object is to provide an improved display, wherein the conventional rear electrode coated with electrochromic material may be alternatively integrated into a single layer construction.

SUMMARY OF THE INVENTION

The present invention relates to an electrochromic display having an improved electrochromic electrode design and the method of producing said display. The invention comprises an electrochromic display including a first substrate with transparent front electrodes and electrochromic layers thereon, an intermediate electrolyte and a second substrate with a rear electroreactive coated electrode. The rear electrode layer is first surface oxidized and then heat treated in a hydrogen or forming gas atmosphere to impart an excess of hydrogen to the layer. The layer is treated in the aforementioned hydrogen atmosphere until a conductive hydrogen-containing oxide coating is formed on the surface, termed herein an electroreactive layer. The layer prolongs cell life and improves the operating characteristics of the display by providing an excess of tightly bound hydrogen to serve as a "getter" for any oxygen entering the cell.

BRIEF DESCRIPTION OF THE DRAWINGS

Other objects and advantages of the invention may be seen from the following description when viewed in conjunction with the accompanying drawings wherein.

DETAILED DESCRIPTION OF THE INVENTION

Figure 1:
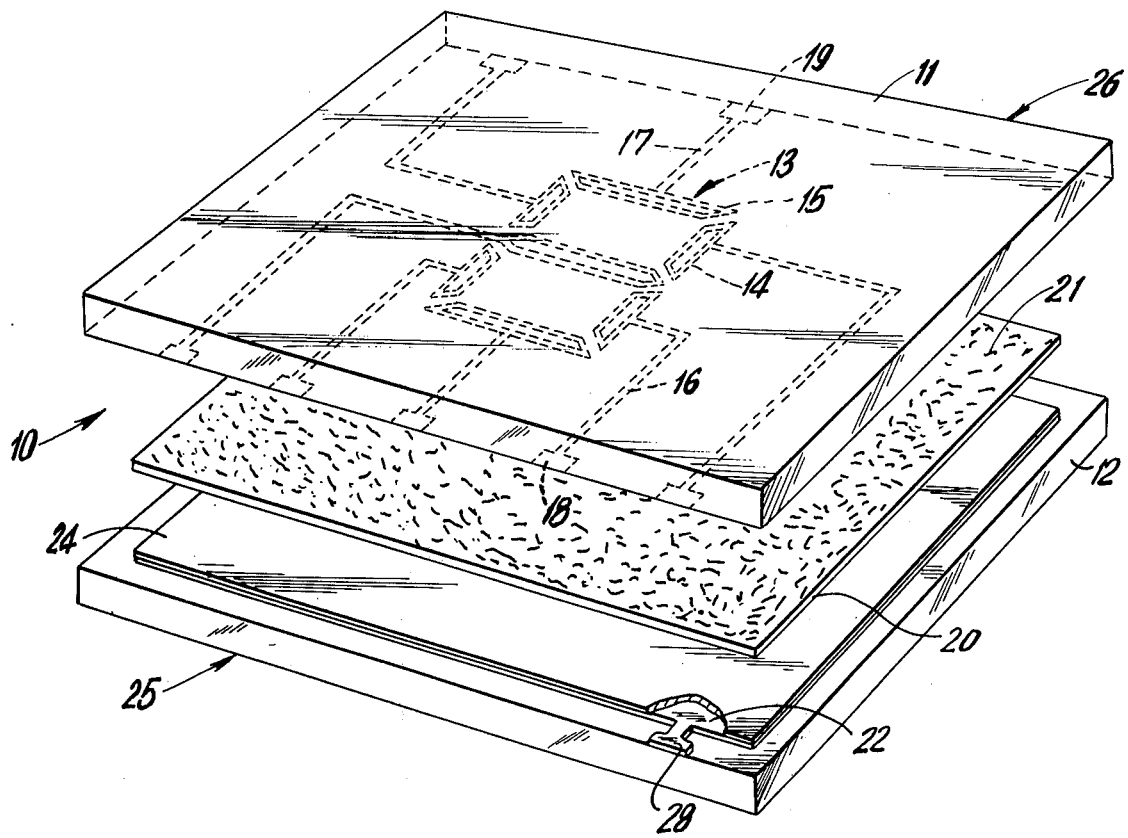
FIG. 1 is an exploded perspective view of an electrochromic display embodying the invention.
Figure 2:
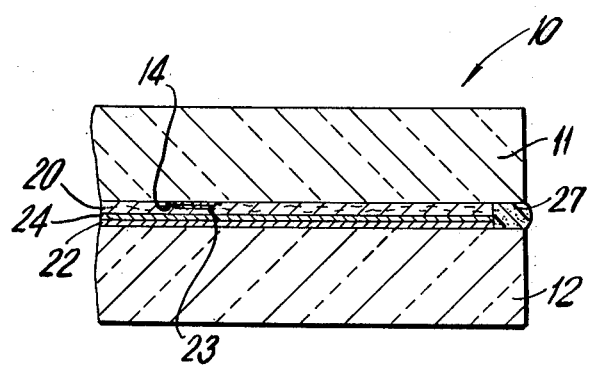
FIG. 2 is an enlarged cross sectional view of the invention taken through an assembled display according to FIG. 1.

Referring now to the drawings, the invention comprises an electrochromic display 10 having a sandwich type construction wherein the display elements are contained between an outer transparent glass or plastic substrate 11 and an inner substrate 12 which need not be transparent. Substrate 11 has a conductive pattern of transparent electrodes 13 on the underside thereof such as segments 14 and 15 of a pattern which can be selectively actuated to form digits or other optical patterns via conductive leads 16 and 17 which lead to terminals 18 and 19. The electrodes 13 may be a tin oxide coating which is etched onto the substrate 11 in a pattern by using a commercially available material known as NESA glass and removing the conductive coating except for the segments 14 and 15.

The display may also include a pigmented porous membrane 20 mounted between the substrates 11 and 12 to prevent viewing into the rear of the display 10 or alternatively the electrolyte 21, between the substrates 11 and 12, may be pigmented and the membrane 20 omitted entirely. The inner substrate 12 may be a glass or ceramic material and has a rear common electrode layer 22 coated thereon leading to terminal 28.

A layer of electrochromic material, indicated as 23 is coated by a process such as vacuum deposition on the front electrode segments 14 and 15. The rear electrode 22 is also coated with suitable material and then surface oxidized and heat treated in a hydrogen atmosphere to form a conductive electroreactive coating 24 on the electrode surface. The preferred material used in the present invention is tungsten oxide.

More specifically, in accordance with one form of the present invention, the rear coating layer 24 may be a tungsten oxide or a tungsten oxide, tungstate mixture which has been oxidized and then heat treated under hydrogen or forming gas prior to deposition on the rear electrode 22. The tungsten oxide or tungsten oxide, tungstate mixture may be in the form of a powder which can be deposited by standard means such as painting, spraying or dip coating onto the rear electrode 22 of the electrochromic display. The mixture can be deposited by itself or with a binder such as cellulose. The rear electrode 22 may be a separate layer of conductive metal or metallized ceramic material. In another form of the invention, the electroreactive layer 24 may be formed in situ or the rear electrode 22 and may even become one single layer of electroreactive material serving the functions of the rear electrode, i.e., to act as electrically conductive member facilitating current flow into the electrolyte. In this form, a tungsten metal film, comparable to layer 22, is applied as a metallized layer on a ceramic base, comparable to substrate 12. The tungsten then is oxidized into a non-conductive tungsten trioxide layer and subsequently reduced to a brown conductive tungsten oxide layer (tungsten bronze) by passing hydrogen or forming gas over the surface.

EXAMPLE NO. 1

On a glass substrate, a conductive film of gold was coated with a mixture of tungsten trioxide and sodium tungstate by spraying. The coated substrate was placed in a tube furnace and heated at a temperature between 250° and 1,000° C while forming gas was passed through the furnace until the surface coating was converted into a brown conductive film.

EXAMPLE NO. 2

A ceramic base was metallized with a layer of tungsten, and in situ oxidation of the tungsten layer was followed by treating the surface oxidized tungsten layer in a hydrogen or forming gas atmosphere. The metallized base was placed in a tube furnace, heating to a temperature between 250°–1,000° C, and sufficient air bled in to oxidize the surface. (The surface may also be oxidized by bubbling water into the furnace.) Hydrogen was then passed over the surface until a brown conductive oxide layer formed on the surface.

ASSEMBLY OF THE DISPLAY

The rear unit or plate 25 comprising substrate or base 12, electrode 22 and the electroreactive layer 24 is then attached to a second plate 26 including conductive glass 11 onto which the desired display pattern has been etched and onto which a tungsten oxide layer 23 has been deposited. A space left between the plates 25 and 26 is filled with a conventional electrolyte. The plates are then hermetically sealed together by adhesive 27. If desired, a pigment can be dispersed in the electrolyte 21 or can be deposited on either of the display elements to improve contrast. Another alternative, as mentioned previously, is to use a pigmented porous membrane 20.

The process imparts a surplus amount of a tightly bound (or thermally stable) form of hydrogen to the layer 24. The electroreactive layer therefore serves as a source of hydrogen ions for coloration in relatively large amounts, so that even if air laks into the cell and removes some hydrogen, there will still remain sufficient hydrogen for cell functioning over an extended period of time. In fact, the layer 24 has so much surplus hydrogen that the material in the rear of the layer does not change color, even when the front portion does.

As a further advantage, the tungsten oxide-hydrogen layer 24 is very electrically conductive. Therefore it serves the function of the rear electrode 22 depicted in the drawings, which may be omitted in certain designs. Also, the display operates at a lower voltage since it is not necessary to generate hydrogen from the electrolyte. A typical operating voltage would be in the order of 0.4 volts. This lower voltage also increases cell life since operating at higher voltages tends to destroy the NESA electrodes 13 over a period of time.

While the invention has been explained by a detailed description of certain specific embodiments, it is understood that various modifications and substitutions can be made in any of them within the scope of the appended claims which are intended also to include equivalents of such embodiments.

I claim:

1. The process of making an electrochromic display which comprises the steps of:
   providing a first substrate having transparent front electrodes and an electrochromic layer thereon,
   providing a second substrate having a rear electrode,
   providing an electroreactive layer for the rear electrode by:
   a. heating an electrochromic material to a temperature ranging from 250° to 1,000° C,
   b. passing hydrogen gas over the surface of the oxidized electrochromic material to impart hydrogen into the material,
   filling the space between the substrates with an electrolyte, and, sealing the first and second substrates together with an adhesive.

2. The process according to claim 1, wherein the rear electrode is a layer of metallized tungsten and is first surface oxidized and then subjected to hydrogen gas in-situ in a furnace to provide said electroreactive layer.

* * * * *